United States Patent [19]

Tehon et al.

[11] Patent Number: 4,458,343

[45] Date of Patent: Jul. 3, 1984

[54] HIGH DYNAMIC COMPLIANCE HYDROPHONE WITH HYDROSTATIC PRESSURE BALANCING

[75] Inventors: Stephen W. Tehon; Evelyn H. Monsay, both of Clay, N.Y.

[73] Assignee: General Electric Company, Syracuse, N.Y.

[21] Appl. No.: 328,335

[22] Filed: Dec. 7, 1981

[51] Int. Cl.³ .............................................. H04R 23/00
[52] U.S. Cl. .................................... 367/149; 367/171; 367/172
[58] Field of Search ............... 367/140, 141, 149, 157, 367/166, 167, 171, 172; 310/337

[56] References Cited

U.S. PATENT DOCUMENTS

| 2,434,900 | 1/1948 | Black et al. | 367/171 X |
| 3,018,466 | 1/1962 | Harris | 310/337 X |
| 3,241,099 | 3/1966 | Elston et al. | 367/167 |
| 3,274,537 | 9/1966 | Toulis | 367/155 |

OTHER PUBLICATIONS

Tietjen, "The Optical Grating Hydrophone," *Journal of the Acoustic Society of America* vol. 69, No. 4, Apr. 1981, pp. 993-997.
Jackson, "An Intensity Modulated Optical Hydrophone," IEEE Electronics and Aerospace Systems Conventions (EASCON Record), Sep. 1980, pp. 42-46.

*Primary Examiner*—Harold J. Tudor
*Assistant Examiner*—Tyrone Davis
*Attorney, Agent, or Firm*—Richard V. Lang; Carl W. Baker

[57] ABSTRACT

The invention relates to hydrophones which require liquid backing of the sensing plate, and more particularly, to compliance enhancing means for use in such hydrophones. In a practical embodiment, in which a compliant sensing plate in the form of a thin diaphragm is employed, liquid backing of the sensing plate is provided to balance the hydrostatic pressure across the sensing plate. To increase the compliance of the hydrophone, reduced by the presence of the backing oil, and to do so in a linear manner, a bellows is introduced into the backing chamber having the desired compliance and pressure rating. The invention is applicable to hydrophones having either compliant or stiff sensing plates. An improvement in hydrophone linearity and sensitivity is obtainable over a significant range of hydrostatic pressures.

6 Claims, 6 Drawing Figures

HIGH DYNAMIC COMPLIANCE HYDROPHONE WITH HYDROSTATIC PRESSURE BALANCING

BACKGROUND OF THE INVENTION

1. Field of the Invention

The invention relates to hydrophones for the reception of acoustic waves in water in shallow or deep applications. The hydrophone herein disclosed has enhanced compliance, which together with hydrostatic pressure balancing permits sensitive and linear operation down to substantial depths.

2. Description of the Prior Art

Hydrophones may be characterized as falling into two classes: compliant hydrophones, which sense acoustic wave displacements; and piezoelectric hydrophones, which sense acoustic pressures. The sensing plate in a piezoelectric hydrophone, customarily a piezoelectric ceramic disk, generates charge and voltage when compressed or bent by incoming acoustic pressure waves. The sensing plate is relatively stiff in itself, but for use at a depth, a pressure balance is normally provided. Such a system is described by Edward T. O'Neill in an article entitled "Pressure-Balanced High-Pressure Hydrophone", Journal of the Acoustic Society of America, 34(11) Oct. 1962, pages 1661-1662.

In this known system substantially equal hydrostatic pressures are maintained between the external and internal surfaces of the sensing member. The external water pressure, acting inwards, is balanced by internal oil pressure acting outwards. The balance pressure is transmitted through a flexible rubber diaphragm, through an oil reservoir, into a capillary tube and finally through the tube to the oil-filled "backing" chamber that adjoins the backside of the sensing member. Slow changes in pressure are equalized by oil flow through the small opening of the capillary tube. Its size-limited flow-rate sharply limits the speed with which pressure in the backing chamber can follow external water pressure, so high frequency pressure changes attributable to acoustic waves are essentially isolated from the pressure in the backing chamber. The design permits one to set a low frequency "cut off" at a desired value, 100 Herz being typical. To an acoustic signal impinging on the sensing member, the backing chamber is a load, in the form of an oilfilled compliant volume, where the compliance is primarily of the oil in a rigidly bounded space.

Since the compliance of an oil-filled volume is small, being formed of only slightly compressible oil, within a volume acoustically held constant, this backing chamber has a low compliance to incoming acoustic signals. With a piezoelectric sensing plate, which is relatively stiff in itself, this backing has a small effect on the internal plate deformation. Thus in the interests of high performance, one may incorporate compliance enhancing means in the interior of the transducer.

When the hydrophone is of a high compliance, both the issues of a hydrostatic pressure balance and compliance enhancement become critical to a practical device. It is essential that there be a hydrostatic pressure balance to avoid rupture, if operation at substantial ambient pressures is contemplated. The application of a low compliance oil backing to a high compliance hydrophone however, very seriously degrades the compliance and thereby the sensitivity of the hydrophone. Assuming the conventional double-chamber hydrostatic pressure balancing system as described in an article by Byron W. Tietjen, bThe Optical Grating Hydrophone", J. Acoust. Soc. Am., 69(4) Apr. 1981, page 993, calculation predicts a 100 fold decrease in hydrophone compliance with the admission of oil into the backing chamber and a corresponding decrease in hydrophone sensitivity.

It is known that one can increase hydrophone compliance and thereby the sensitivity (at atmospheric pressure) in a system using an oil-filled backing chamber by introducing a small amount of gas into the backing chamber. The gas is a high compliance material at atmospheric pressure. When present with the low compliance oil in the backing chamber, the gas (at atmospheric pressure) increases the compliance presented to the internal face of the sensing plate, and thereby the compliance of the hydrophone. Materials which add compliance when installed in a liquid filled hydrophone have been characterized as "pressure release" materials.

Gas, however, is unsatisfactory as a compliance increasing agent for most hydrophone applications. Since the pressure volume product is constant for a gas, when subject to a high hydrostatic pressure, the volume decreases in inverse proportion to pressure and the compliance as a square of that ratio. At 1500 psi, for example, the compliance of the enclosed gas is reduced from its atmospheric value by a factor of 10,000. Therefore, the effective compliance with gas inclusions reduces rapidly with pressure, producing a hydrophone sensitivity which also drops rapidly with pressure. The approach is usually unsatisfactory even at shallow depths.

It is also known that compliant structures such as slightly flattened tubes may be disposed in the water for purposes of causing acoustic refraction and scattering. Such use of compliant tubes is discussed in two articles entitled "Acoustic Refraction and Scattering with Compliant Elements" (Part I, Measurements in Water, J. Acoust. Soc. Am., Volume 29, No. 9, Sept. 1957, pages 1021-1026, and Part II, Analysis, pages 1027-1033).

In an article by Gerald A. Brigham entitled "On the Theory of Stress Constrained Optimum Compliant Tubes and Uniform Tube Arrays" J. Acoust. Soc. Am. 69(6) June 1981, pages 1545-1556 compliant tubes are again dealt with. The article deals primarily with the low frequency model for the plane wave transmissivity of a planar uniform grating of compliant tubes. The article, however, makes reference to the use of "uncompensated compliant tubes either as reflectors or as pressure release components for the interior of underwater transducers...." The article implies that such useage of compliant tubes in underwater transducers is of limited usefulness but adds no details.

In a Government report entitled "Handbook of Hydrophone Element Design Technology" prepared for the Naval Electronic Systems Command by Charles LeBlanc, NUSC, Technical Document 5813, Oct. 11, 1978, a review was made of "pressure release materials", which concluded that satisfactory materials for deep water hydrophone designs do not exist. The article, considering operation up to a pressure of 10K psi (70MPa), reviews a number of suggested materials including Corprene DC100, a composite of polychloroprene and cork, (R. Higgs and L. Eriksson, "Acoustic Decoupling Properties of Corprene DC-100," J. Acoust. Soc. Am., vol. 46, no. 5 (Part 2), Nov. 1969, page 1254); onionskin paper, (R. Higgs and L. Eriksson, "Acoustic Decoupling Properties of Onionskin Paper," J. Acoust. Soc. Am., vol. 46, no. 1 (Part 2), July 1969, page 211); and Sonite, an adaption for acoustic purposes of a thermal insulator called MIN-K 2000, (A. Jabin, "Physical Properties of Sonite," Report No. 3901-26, Johns Manville Research and Engineering Center, Manville, N.J., 1970.)

The NUSC Handbook adds that a further drawback of these materials less important than the limitations in their acoustic performance at high pressure (i.e. Sonite, Corprene) is that they have to be encapsulated to prevent degradation. Nevertheless, the report writer is encouraged to state "improvements can be made in pressure release materials, even though we are a long way from achieving the ideal. . . "

The NUSC Handbook concludes, "As a last comment, let it suffice to say that pressure release materials useable to great depth will not be available in the near future, and thus emphasis should be placed on the designer's ingenuity in circumventing the need for such materials in deep submergence hydrophones."

SUMMARY OF INVENTION

Accordingly, it is an object of the present invention to increase the dynamic compliance of a hydrophone.

It is another object of the invention to increase the dynamic compliance of a hydrophone with hydrostatic pressure balancing.

It is still another object of the invention to increase the sensitivity of a hydrophone with hydrostatic pressure balancing.

It is a further object of the invention to increase the ambient hydrostatic pressure for sensitive operation of a hydrophone with a hydrostatic pressure balance.

It is another object of the invention to provide an improved hydrophone of the type having a high compliance sensing plate.

It is still another object of the invention to provide an improved pressure balanced hydrophone of the type having a high compliance sensing plate.

It is a further object of the invention to enhance the compliance of a pressure balanced, high compliance hydrophone.

It is yet another object of the invention to increase the ambient hydrostatic pressure for accurate operation of a high compliance, pressure balanced hydrophone.

These and other objects of the invention are achieved in a hydrophone for sensing acoustic vibrations in a liquid medium. The hydrophone includes a liquid filled chamber, and an acoustic wave sensing member on a surface of the chamber, the internal surface of the sensing member confining the filling liquid, the external surface of the sensing member being immersed in the medium and deforming in response to acoustic waves in the medium. In accordance with the invention a bellows is disposed in the chamber having a compliance greater than the filling liquid for increasing the compliance of the hydrophone and thereby its sensitivity. The bellows is selected to have a linear compliance through the range of hydrostatic pressures to which the hydrophone is to be subjected.

In a hydrostatically balanced hydrophone, a first and a second liquid filled chamber are provided, the first being a backing chamber for the sensing member and the second a reservoir for the liquid filling. The sensing member is supported on the surface of the first chamber. A compliant diaphragm is provided on a surface of the second chamber, the internal surface of the diaphragm also confining the filling liquid in the second chamber, while the external surface of the diaphragm is immersed in the medium for equalizing the hydrostatic pressure within the second chamber to the hydrostatic pressure of the medium. Means are also provided for interconnecting the first and second chambers to equalize their internal hydrostatic pressures while permitting a difference in their internal hydrodynamic pressures in the acoustic frequency range of interest. In accordance with the invention, a bellows is disposed in the first chamber having a compliance greater than that of the liquid filling for increasing the compliance of the hydrophone, and thereby its sensitivity.

In practice, the bellows is selected to have a linear compliance through the range of hydrostatic pressures to which the hydrophone is to be subjected. The resonance frequency of the bellows is set higher than the highest acoustic frequencies to be sensed so that the compliance of the bellows, rather than the mass of the bellows, is effective in determining the hydrophone sensitivity and produces an increase in compliance. The interconnecting means between chambers is a capillary tube whose design together with that of the second chamber establishes a low frequency cut-off below the lowest acoustic frequency to be sensed. The bellows is sealed and contains insufficient gas filling to significantly reduce the hydrophone sensitivity or linearity.

In accordance with another facet of the invention, the hydrophone is of the type employing a compliant sensing diaphragm in which displacement of the diaphragm is used to sense acoustic waves.

Typically, the displacement produces an amplitude modulated light signal using means including a stationary optical transmission grating, and an optical transmission grating moving with the sensing diaphragm. Fiber optic means are provided for coupling light into and out of the light modulating arrangement.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

FIG. 1A is a cut-away perspective view of the hydrophone showing the interior design; FIG. 1B is a view of the exterior of the hydrophone showing its optical connections and dimensions; and FIG. 1C is a simplified view of the sensing diaphragm, which is of a compliant design, and the optical grating by which its displacement is sensed;

DESCRIPTION OF THE PREFERRED EMBODIMENT

Figure 1A:
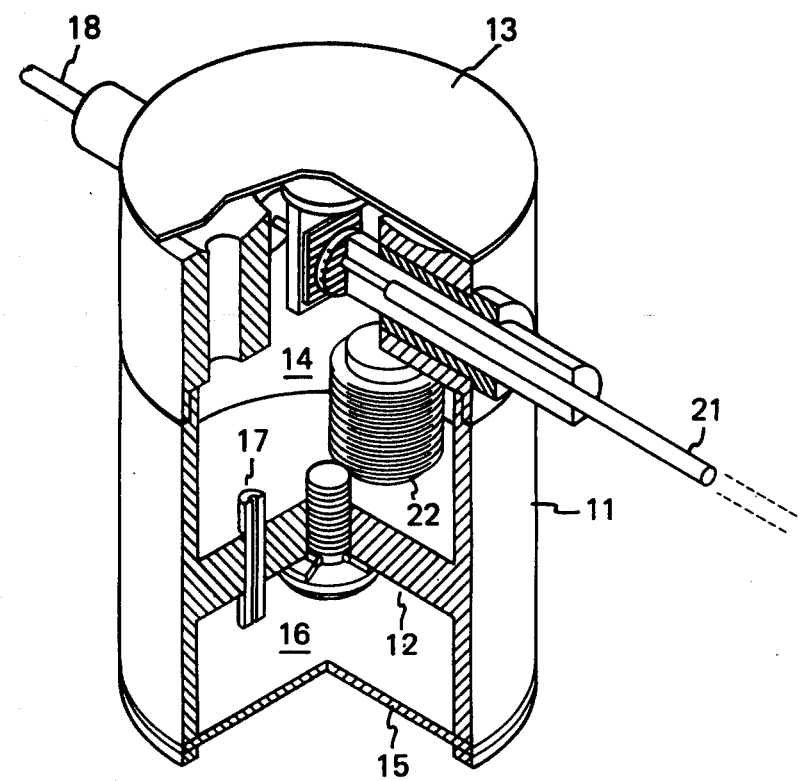
FIGS. 1A, 1B and 1C are views of a pressure balanced hydrophone incorporating the inventive compliance enhancing means.
Figure 1B:
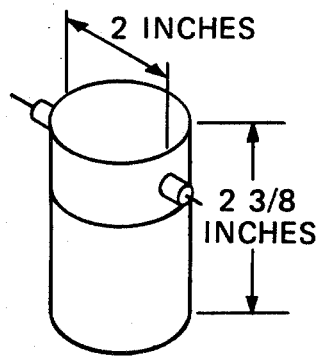

Referring now to FIGS. 1A and 1B, a novel hydrophone is shown for use over a substantial range of depths. The novel hydrophone is sensitive at substantial depths and the sensitivity is substantially independent of depth, at depths less than a maximum design depth. The design entails the use of a compliant diaphragm, the displacement of which is used to sense acoustic vibrations. The diaphragm is protected against rupture from the ambient hydrostatic pressure by the use of oil in a backing chamber which supports the back of the diaphragm at ambient hydrostatic pressure. The oil backing beneficially equalizes the hydrostatic pressure across the diaphragm permitting a very thin compliant design, but since the oil backing the diaphragm is virtually incompressible, it has the adverse consequence of reducing the effective compliance of the hydrophone.

The hydrostatic pressure balancing feature is not in itself the subject of the present invention. The pressure balancing, herein disclosed, is treated in a letter entitled "Pressure-Balanced High Pressure Hydrophone", Edward T. O'Neill, J. Acoust. Soc. Am. 34(11) Oct. 1962, pages 1661-1662.

In accordance with the invention, a wide range linear spring in the form of a sealed bellows, disposed in the backing chamber, relieves the dynamic acoustic pressure behind the diaphragm; greatly reducing the loss in signal compliance due to the presence of the oil. The compliance improvement in an oil backed hydrophone is calculated to be approximately 40 db for a practical embodiment, and typically well within an order of magnitude of the compliance obtained in a system without oil backing, but with an air filling at atmospheric pressure, (as will be discussed subsequently).

Figure 1C:
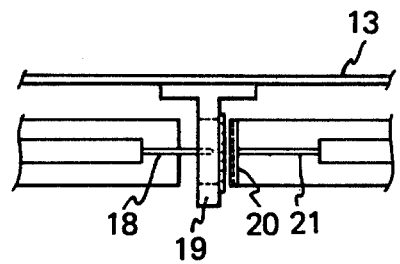

The hydrophone shown in FIG. 1A is an optical hydrophone operating upon the principle that the diaphragm is sufficiently compliant to be displaced by sub-angstrom acoustic waves in the water and displaceable over frequencies ranging typically from below 100 Hz to above 1000 Hz. The displacement of the diaphragm 13 is measured by optical means shown in FIG. 1C. These means comprise a first light fiber 18, by means of which light of fixed intensity is directed successively through a first movable grating 19, supported to move with the diaphragm 13 through a stationary transmission grating 20 to a second light fiber 21. The stationary grating 20 is supported on the upper end surface of the rigid side wall (11) of the hydrophone. Light passing through both the movable (19) and stationary (20) grating is collected by the second light fiber 21, at which light is derived, modulated in amplitude in accordance with the mutual displacement of the two gratings. The input and output fibers are 400 micrometers in diameter, and a grating line density of 250 lines per inch is employed. In a simple application, relay optics are unnecessary, and the fibers merely fractured and brought into close proximity with the adjoining gratings. One may also employ finer gratings in the interests of greater sensitivity and "Selfoc" lenses bonded to the fiber ends for collimating the light transmitted and received. Such an optical system is treated in an article entitled "Schlieren Multi-Mode FibreOptic Hydrophone", W. B. Spillman, Jr., and D. H. McMahon, Applied Physics Letters 37(2), July 15, 1980, 1980 American Institute of Physics, pages 145-146.

The gratings should be adjusted in final assembly in the axial dimension so that the acoustic vibrations produce a substantially linear variation in light output with displacement.

The optical grating technique for measurement of diaphragm displacement is not in itself the subject of the present invention, and other measurement techniques of comparable sensitivity may be employed. The optical grating measurement technique, herein disclosed, is treated in the article by Byron W. Tietjen, earlier cited.

Continuing, the novel hydrophone has a cylindrical configuration with rigid side walls 11, and a rigid central partition 12 dividing the hydrophone into two chambers. A compliant diaphragm or sensing membrane 13, typically of 0.020" thick aluminum is supported by and sealed (by an epoxy cement) to the upper end of the side wall. The diaphragm 13, together with the upper portion of the side wall 11 and the central partitions 12 define the oil-filled backing chamber 14. A second diaphragm 15 of rubber is supported by and sealed to the lower end of the side wall. The diaphragm 15, together with the lower portion of the side wall 11 and the central partition 12 define the oil reservoir 16. The two chambers are interconnected by a capillary tube 17 which equalizes the hydrostatic pressure between chambers, while permitting dynamic differences in pressure, over the frequency range of interest. For operation down to 100 Hz, the capillary tube is about $\frac{1}{2}$" long and has a diameter of about 0.08", assuming mineral oil USP in the backing chamber, and a chamber volume of about 50 cc.

FIG. 1B illustrates the external appearance, the dimensions and the optical fiber connections to the hydrophone. As illustrated, the hydrophone has a 2" external diameter and is $2\frac{3}{8}$" high.

The novel compliance increasing means is the bellows 22, disposed in the oil-filled backing chamber and supported on the central partition 12. The bellows is sealed to preclude the admission of water and to maintain an evacuated state (or a gas filling at a sufficiently low pressure to avoid a substantial reduction in compliance).

Figure 2:
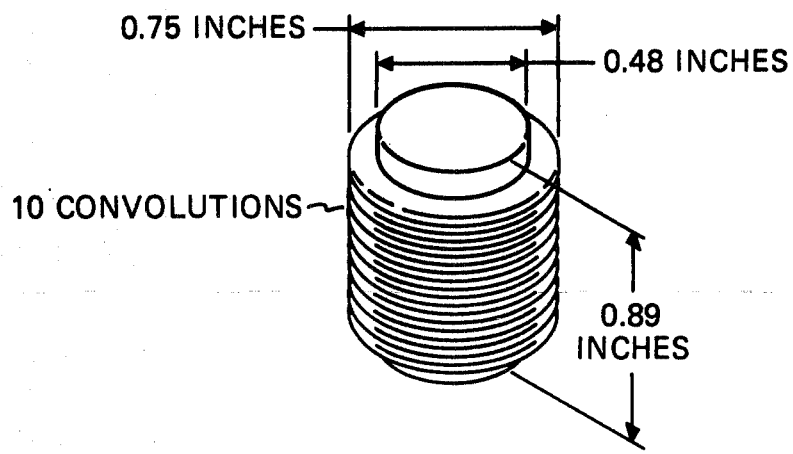
FIG. 2 is an illustration of the bellows and its principal dimensions.

The bellows 22 is supported upon the central partition 12 of the hydrophone as shown in FIG. 1A The bellows itself is illustrated in FIG. 2, which also shows the principal dimensions. An exemplary bellows is manufactured by the Gardner Bellows Corporation, Stock No. S191006. The bellows is "electroformed" having 10 convolutions, an outside diameter of 0.750", inside diameter of 0.480", a wall thickness of 0.10", a spring rate of 800 lbs/ inch, and a pressure rating of 1500 psi, with full travel being 0.16". The ends of the bellows are sealed with end plugs, and the bellows is attached to the partition 12, by an epoxy adhesive between the lower plug and partition. The upper plug is left free to rise and fall within the backing chamber.

Sensitive operation of a hydrophone of the type using a compliance diaphragm is achieved by providing a highly compliant fill for the interior chamber. Experience shows that an air filled hydrophone can be as much as 30 dB to 40 dB more sensitive than an oil-filled hydrophone of the same design. Experiments at atmospheric pressure indicate an immediate loss of 25 dB for a particular hydrophone for which 15 dB improvement was gained by the inclusion of a bellows (suitable for operation at 1500 psi) in the oil-filled hydrophone. Mathematical projections indicate that the sensitivity will remain at approximately the same value up to the design pressure limit (1500 psi) of the bellows.

The analysis follows.

Figure 3A:
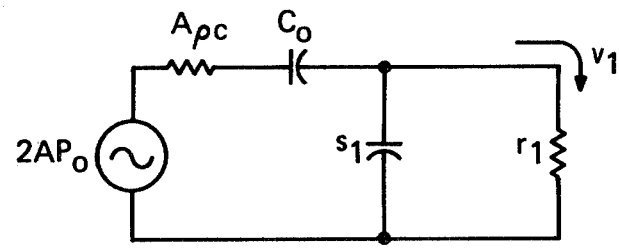
FIGS. 3A and 3B are two equivalent circuit representations of the mechanical properties of the hydrophone shown in FIG. 1, useful in the mathematical analysis of hydrophone performance.

If the acoustically sensitive diaphragm of the hydrophone is light and thin, then the effects of the parameters $m_o$ (oil mass) and $r_o$ (oil mechanical resistance) are negligible in comparison with the effect of $C_o$, the compliance of the oil in the chamber. Also, if the diaphragm resonance lies above the frequency band of interest, the effects of $m_1$ (diaphragm mass) are small. Under these conditions, the analog circuit diagram of FIG. 3A applies to the hydrophone. The mechanical impedance formed by $s_1$ and $r_1$ (diaphragm stiffness and resistance) is given by $$z_1 = \frac{r_1 s_1^2 - j\omega r_1^2 s_1}{s_1^2 + \omega^2 r_1^2}. \tag{1}$$

Over any small frequency range, it is conventional to regard the impedance of $r_1$ in parallel with $s_1$ as the equivalent series combination of a resistance $R_1$ and a compliance $C_1$ where $$R_1 = \frac{r_1 s_1^2}{s_1^2 + \omega^2 r_1^2} = \frac{r_1}{1 + \omega^2 r_1^2/s_1^2} \tag{2}$$

and $$\frac{1}{j\omega C_1} = \frac{\omega^2 r_1^2 s_1}{j\omega(s_1^2 + \omega^2 r_1^2)} = \frac{s_1}{j\omega(1 + s_1^2/\omega^2 r_1^2)} \tag{3}$$

$$C_1 = \frac{1}{s_1}\left(1 + \frac{s_1^2}{\omega^2 r_1^2}\right). \tag{4}$$

Figure 3B:
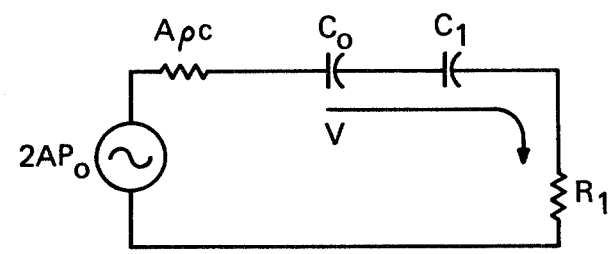

The analog circuit is then reduced to that of FIG. 3B.

In an air-filled hydrophone, (the airfilled equivalent to $C_o$), $C_a$ is extremely large so that the effects of the air are negligible ($1/\omega C_a = 0$). However, with an oil fill, $C_o < C_1$ and the compliance of the fluid dominates ($1/\omega C_o > 1/\omega C_1$). The acoustic compliance of the fluid is defined as the ratio of the volume of flow through an opening to the resulting pressure change in a rigid container holding a total volume V of fluid. In our analysis, we have that the impedance $(j\omega C_o)^{-1}$ is given by the ratio of the total force AP to the reference velocity $\dot{x} = j\omega x$ for displacement x, at the point on the diaphragm supporting the grating, i.e., $$C_o = X/AP, \tag{5}$$

where "A" is the area subject to pressure (P) Equation (5) implies that $$A^2 C_o = \Delta V/P \tag{6}$$

The right-hand side of Equation 6 fulfills the definition of acoustic compliance given above. Hence, using the standard expression for the acoustic compliance, $V/pc^2$, where p is the density of the liquid fill and c is the speed of sound in the liquid, $$C_o = V/A^2 pc^2. \tag{7}$$

Suppose now that a metal bellows, rated for high static pressure applications, with end area S, zero-depth (i.e., 14.7 psi) length $l_o$ and volume W is placed in the hydrophone's upper chamber as indicated in FIG. 1. (The bellows may be permanently evacuated or filled with a gas at a sufficiently low pressure to not significantly decrease the compliance.)

The acoustic compliance of the enclosed volume is now increased by the compliance of the bellows.

The volume change due to the bellows is $$\Delta W = S\Delta lP = SP/k \tag{8}$$

for spring constant k given in terms of the bellows' spring rate $\bar{k}$ by $$k = \bar{k}/S. \tag{9}$$

The compliance of the interior of the hydrophone is now given by the compliances of liquid and bellows in parallel, i.e., the sum $$C_O + C_B = C_O(1 + C_B/C_O) \tag{10}$$

where $$\frac{C_B}{C_o} = \frac{\Delta W}{A^2 P} \cdot \frac{A^2 pc^2}{V} = \frac{Spc^2}{kV} = \frac{S^2 pc^2}{\bar{k} V}. \tag{11}$$

Let us consider a stainless steel bellows rated to work at up to 1500 psi of static pressure with a spring rate $\bar{k} = 800$ lbs/in $= 1.4 \times 10^5$ N/m and end area $S = 1.92 \times 10^{-4}$ m$^2$ to be used in an oil-filled hydrophone of interior volume (upper chamber) $V = 10^{-6}$ m$^3$. For oil, we may use p ~ 1000 kg/m$^3$ and c ~ $1.5 \times 10^3$ m/sec. The calculated increase in compliance due to the addition of the bellows is given by $$C_B/C_o = 592 \tag{12}$$

which will be reflected in greatly increased sensitivity of the fluid-filled optical grating hydrophone under conditions of high static pressure.

To arrive at an estimate of the increased sensitivity of the hydrophone, note that the relative change in pressure sensitivity is given by the inverse of the compliance ratio, all else remaining constant. The total compliance of the hydrophone ($C_H$) is given by:

$$C_H = \frac{1}{\frac{1}{C_O} + \frac{1}{C_1}} \approx \frac{C_O C_1}{C_1 + C_O} \tag{13}$$

For the relative sensitivities of the oil and air-filled hydrophone, we have the experimental result $$\frac{P_{min}(\text{oil})}{P_{min}(\text{air})} = \frac{1/C_O}{1/C_1} = \frac{C_1}{C_O} \approx +40 \text{ dB.} \tag{14}$$

Since $C_1 = 100 C_o$, the oil bellows compliance $C_B$ is approximately six times that of the diaphragm. To find the sensitivity of an oil filled hydrophone relative to that containing a bellows;

$$\frac{P_{min}(\text{oil})}{P_{min}(\text{oil + bellows})} = \tag{15}$$

$$\frac{C_1(C_O + C_B)}{C_1 + (C_O + C_B)} \cdot \frac{1}{C_O} \approx \frac{100(C_O + C_B)}{(101 C_O + C_B)}$$

But $C_B \approx 600 C_o$, so that $$\frac{P_{min}(\text{oil})}{P_{min}(\text{oil + bellows})} \approx \frac{6 \times 10^4}{7 \times 10^2} \approx 39 \text{ dB} \tag{16}$$

The previous analysis predicts an approximately 40 db decrease in the minimum detectable pressure for a liquid-filled hydrophone when the bellows described above is added to the design. This increase in sensitivity is constant up to the limiting pressure for the bellows. In the practical embodiment discussed, the compliance of the hydrophone is limited by the compliance of the diaphragm, the compliance of the bellows being six times that of the diaphragm. Some slight improvement may be achieved by increasing the compliance of the bellows, but in general, the indicated choice, in which the compliance of the bellows is greater than that of the diaphragm is satisfactory. The exact optimum value is dependent on this parameter ratio, and certain other requirments, such as the pressure rating of the system, system stability, and the resonance properties of the bellows. In general, an excessively compliant bellows may not have the necessary pressure rating, and excessive compliance may unnecessarily reduce the upper frequency limit for sensitive hydrophone operation.

The design discussion assumes that the bellows resonant frequency is above the highest acoustic frequency to be detected, since the bellows is equivalently represented as a compliance when so operated. At frequencies higher than the bellows resonant frequency, inertial limiting of the bellows motion will occur, and the design assumptions will no longer apply.

In the design just discussed, calculation indicates bellows resonance at 1309 Hz, a figure which is reduced by the provision of the indicated end caps. The experimental value places the bellows resonant frequency as slightly above 1000 Hz, indicating satisfactory hydrophone performance up to approximately that frequency. In general, the useable characteristic of the hydrophone will reflect a relatively smooth sensitivity plot as the frequency of the waves being sensed increases to the vicinity of bellows resonance. At bellows resonance, a deep notch should occur, followed by a steady 6 db per octave decline from the pre-notch value as inertial limiting now predominates. Operation with acoustic waves above bellows resonance should normally be avoided.

While the practical bellows design herein discussed permits sensitive hydrophone operation and linear hydrophone operation up to pressures of approximately 1500 psi, it should be evident that the bellows and thereby the hydrophone may be designed for higher hydrostatic pressures. Calculations indicate that at pressures required for deep submergence very little additional loss in sensitivity (over a design for lower pressures) will occur, when a bellows designed for such use is employed. As before, such a bellows will permit linear operation up to the design depth.

While the compliance enhancing bellows has been shown in a hydrophone employing a high compliance sensing diaphragm, it should be evident that compliance enhancement is also advantageous in hydrophones having relatively low compliance diaphragms--such as the piezoelectric devices referred to earlier. When used with low compliance diaphragms, the improvement in sensitivity and linearity may not be so large as in hydrophones employing high compliance diaphragms. However, an improvement in such performance has been sought in the past and is available by the means herein described.

What is claimed as new and desired to be secured by Letters Patent of the United States is:

1. A hydrophone for sensing acoustic waves in a liquid medium comprising:
   a. a liquid filled chamber,
   b. an acoustic wave sensing member on a surface of said chamber, the internal surface of the sensing member confining the filling liquid, the external surface of the sensing member being immersed in said medium and deforming in response to acoustic waves in said medium, and
   c. compliance increasing means comprising a bellows disposed in said chamber having a compliance linear compliance through the range of hydrostatic pressures to which the hydrophone is to be subjected, said greater than the filling liquid for increasing the compliance being of the hydrophone and thereby its sensitivity.

2. A hydrohone for sensing acoustic waves in liquid medium comprising:
   a. a first and a second liquid filled chamber,
   b. an acoustic wave sensing member on a surface of said first chamber, the internal surface of the sensing member confining the filling liquid, the external surface of the sensing member being immersed in said medium and displacable in response to acoustic vibrations in said medium,
   c. a compliant diaphragm on a surface of said second chamber, the internal surface of the diaphragm confining the filling liquid, the external surface of the diaphragm being immersed in said medium for equalizing the hydrostatic pressure within said second chamber to the hydrostatic pressure of the medium,
   d. means interconnecting said first and second chambers to equalize their internal hydrostatic pressures while permitting a difference in their internal hydrodynamic pressures in the acoustic frequency range of interest, and
   e. compliance increasing means comprising a bellows disposed in said first chamber having a linear compliance through the range of hydrostatic pressures to which the hydrophone is to be subjected, said compliance being greater than that of the liquid filling said first chamber for increasing the compliance of said hydrophone, and thereby its sensitivity, 3. A hydrophone as set forth in claim 2 wherein the resonance frequency of said bellows is set higher than the highest acoustic frequencies to be sensed so that the compliance of the bellows, rather than the mass of the bellows, is effective in determining the hydrophone sensitivity, and produces an increase in compliance.

4. A hydrophone as set forth in claim 3 wherein the interconnecting means is a capillary tube whose design together with that of the second chamber establishes a low frequency cut-off below the acoustic frequencies to be sensed.

5. A hydrophone as set forth in claim 4 wherein said bellows is sealed and contains insufficient gas filling to significantly reduce the hydrophone sensitivity or linearity.

6. A hydrophone as set forth in claim 5 wherein said acoustic sensing member is a compliant diaphragm, the displacement of which is used to sense acoustic waves.

* * * * *